3,296,152
POLYMERIZATION OF ORGANIC EPOXIDES USING CERTAIN METALLIC OXIDES AND METALLO ORGANO COMPOUNDS
Marco A. Achon, Akron, Ohio, assignor to The General Tire & Rubber Company, Akron, Ohio, a corporation of Ohio
No Drawing. Filed Jan. 18, 1961, Ser. No. 83,361
10 Claims. (Cl. 260—2)

The present invention relates to the polymerization of organic epoxides. In particular, the present invention relates to methods for the preparation of materials useful as catalysts in the polymerization of said epoxides, to the materials themselves, and to methods for the polymerization of said epoxides employing novel catalytic material.

It is an object of the present invention to provide a method for the preparation of materials useful as catalysts or catalytic compositions in the polymerization of organic epoxides.

Another object of the present invention is to provide a composition useful as a catalyst or catalytic material in the polymerization of organic epoxides.

A further object is to provide a method for the polymerization of organic epoxides utilizing certain novel materials having catalytic properties to effect the desired polymerization.

These and other objects and advantages of the present invention will become more apparent to those skilled in the art from the following detailed description and examples.

According to the present invention it has been discovered that organic epoxide compounds can readily be polymerized by the use of at least one inorganic oxide of the group consisting of antimony trioxide, antimony tetraoxide, antimony penta oxide, boron oxide, chromium trioxide, stannous oxide and stannic oxide which have been activated with at least one organometallic compound selected from the group consisting of $AlR_3$, $CdR_2$ and $ZnR_2$ where R is at least one hydrocarbon radical of from 1 to 20 carbon atoms and, preferably, is free of aliphatic unsaturation.

The oxides such as antimony trioxide, antimony tetraoxide, antimony pentaoxide, boron oxide, chromium trioxide, stannous oxide and stannic oxide should preferably be free or essentially free of occluded water and water of crystallization. They, also, desirably should be in finely divided form or powdered. The oxides can be used singly or in mixtures. Of these oxides it is preferred to employ antimony trioxide which affords the best results on polymerization.

Examples of aluminum, cadmium and zinc organic compounds which can be employed in making the catalyst product of the present invention are trimethyl aluminum, triethyl aluminum, triphenyl aluminum, tributyl aluminum, triisobutyl aluminum, diethyl methyl aluminum, triethenyl aluminum, tri(2-butenyl) aluminum, tricyclohexyl aluminum, tritolyl aluminum, tribenzyl aluminum, methyl-, ethyl-, cyclohexyl aluminum, tricyclobutenyl aluminum, diethyl phenyl aluminum, diphenyl cyclohexyl aluminum, trinaphthyl aluminum, tribiphenylyl aluminum, triheptyl aluminum, trieicosenyl aluminum, tripentadecyl aluminum, trieicosyl aluminum, tri(triphenyl methyl) aluminum, triduryl aluminum, tri(2,3-dimethyl-1,3-butadienyl) aluminum, triterphenylyl aluminum, tripropyl aluminum, dimethyl cadmium, diethyl cadmium, dipropyl cadmium, dibutyl cadmium, diethenyl cadmium, dipropenyl cadmium, diisoamyl cadmium, methyl ethyl cadmium, dioctadecyl cadmium, dieicosyl cadmium, diphenyl cadmium, phenyl benzyl cadmium, phenyl ethyl cadmium, dialpha naphthyl cadmium, dicyclohexyl cadmium, dicycloheptenyl cadmium, di(phenyl cyclobutylene) cadmium, butyl cycloheptyl cadmium, di(2-methyl-1,3-butadienyl) cadmium, di(butyl phenylene cyclohexylene) cadmium, didecenyl cadmium, dianthryl cadmium, diduryl cadmium, cyclohexyl phenyl cadmium, dimesityl cadmium, diisobutyl cadmium, dimethyl zinc, diethyl zinc, di-n-propyl zinc, dibutenyl zinc, di-n-butyl zinc, diisobutyl zinc, diphenyl zinc, di-o-tolyl zinc, diethenyl zinc, dinonadecyl zinc, dicycloheptyl zinc, dicyclohexenyl zinc, dicyclobutyl zinc, di(1,1'-binaphthyl) zinc, di(bicyclodecyl) zinc, di(1,3-butadienyl) zinc, ethyl benzyl zinc, didodecyl zinc, di(phenyl butylene) zinc, di(dodecenyl) zinc, di(cyclohexyl benzylene) zinc, di(methyl cyclohexylene) zinc, dieicosyl zinc, methyl tolyl cyclohexylene zinc, methyl cyclohexyl zinc, phenyl cyclohexyl zinc, dioctyl zinc, didecyl zinc, and the like, such as the Al, Cd and Zn alkyl, aryl, cyclo-aliphatic, alkenyl, alkadienyl, cycloalkenyl, alkyl-aryl, aryl-cyclo-aliphatic, arylalkenyl, alkenyl-cycloalkenyl, alkyl-cycloaliphatic and alkyl-aryl-cycloaliphatic compounds and the like and mixtures of the same in which the alkyl, aryl groups etc. can be the same or different. Of these compounds it is preferred to use the dialkyl zinc compounds, especially those having from 1 to 10 carbon atoms.

If not readily available, the organometallic compounds can easily be prepared by methods well known to the art. For example, the trialkyl aluminum compounds are prepared from aluminum chloride and a Grignard reagent, and the triaryl aluminum compounds are prepared from aluminum and the mercurials. The organo cadmium compounds are best prepared from anhydrous cadmium chloride and a Grignard reagent. Synthesis of the alkyl zinc compounds is readily effected by the action of zinc on an alkyl iodide or on a mixture of an alkyl iodide and bromide, for example, $C_2H_5I + Zn \rightarrow C_2H_5ZnI$ which when heated gives $2\ C_2H_5ZnI \rightleftharpoons (C_2H_5)_2\ Zn + ZnI_2$. The diethyl zinc can easily be removed from the mixture. The diaryl zinc compounds are best prepared from the mercurials, for example,

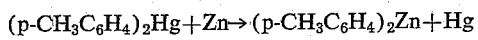
$(p\text{-}CH_3C_6H_4)_2Hg + Zn \rightarrow (p\text{-}CH_3C_6H_4)_2Zn + Hg$ The cycloaliphatic metallics can be prepared in similar ways as well as the mixed organometallics.

The inorganic oxide alone will not cause polymerization of the organic epoxide. Even when the oxide is dried or is heated at elevated temperatures, a process which will activate some materials for other polymerizations, it is not activated for the polymerization of epoxides. On the other hand the organometallics alone do not effect polymerization of the organic epoxides. However, when the oxide is treated with the organometallic, it becomes activated for the polymerization of organic epoxides. For example, the oxide can be treated with the organometallic in solvent, the resulting solution decanted from the solid and used again for three or more successive times for the treatment of additional new batches of the oxide. In each instance the organometallic activated the oxide for epoxide polymerization. Even when the activated oxide was washed several times with the solvent alone (free of organometallic), the oxide was still highly active for the polymerization of epoxides. Thus, the solvent washing should have removed all traces of the organometallic, yet the oxide was still activated. Hence, only small or minor amounts of the organometallic need be used to obtain the desired results.

It is not precisely known what occurs during treatment of the inorganic oxide with the oraganometallic compound. It may be that a complex or reaction product is formed or that small amounts of the organometalic remain absorbed on the oxide to in some fashion act on or with the oxide to serve as catalytic centers. On the other hand, it may be possible that the oxide holds the organometallic in such a fashion that it serves as an active site for the catalytic polymerization of the organic epoxide. In any event whatever may be the true explanation, it has been found that when the oxide is activated with the organometallic compound, materials are obtained which are very useful as catalysts for the polymerization of epoxide compounds.

A feature of the inorganic oxide catalysts of the present invention is that they require only relatively small amounts of the expensive organometallics in their manufacture to achieve the desired results in polymerization. Also, these activated oxide catalysts are less dangerous to handle than the organometallics when mixing them in the factory with the oxides and of which many may spontaneously ignite on exposure air. Hence, the novel catalysts of the present invention can be prepared by experienced personnel in high pressure laboratories and then delivered to pilot plants or polymer plants where they can be handled readily by less experienced personnel in charging the polymerization reactors. If a storage or handling vessel containing the novel catalyst breaks, or the catalyst is spilled, the danger to factory personnel of rapid spontaneous combustion is not present as when a large amount of the organometallic compound is being handled.

The inorganic oxide can be treated with the organometallic in mass or bulk as a liquid without solvent or in solvent. Where the organometallic is readily vaporized, or in the form of a vapor on gas, the vapor can be used to treat the oxide. Preferably, the organometallic is dissolved or dispersed in an organic solvent and the resulting material, preferably in solution form, is mixed and/or reacted with the oxide.

The amount of organometallic to use in treating the inorganic oxide can vary widely. Very small amounts are effective while large amounts will prove wasteful. In general, there should be used only that amount which will be sufficient to activate the oxide. When the oxide is treated with a solution of the organometallic, somewhat larger amounts of the organometallic should be employed to obtain the desired concentration and to reduce the time involved. However, again, very dilute solutions can be employed. In general, especially when a solvent is employed during the initial treating step, the relative mol ratio of the organometallic compound to the inorganic oxide can vary from about 0.03:1 to 12.0:1 while it is preferred that the mol ratio of the organometallic to the oxide be from about 0.1:1 to 3.5:1.

Instead of using batch processes to prepare the activated inorganic oxide, the oxide can be passed through a vessel in one direction while the metal organic in vapor form or in organic solvent is passed countercurrently through the moving bed of the oxide and then the organometallic withdrawn and recirculated to the vessel. The organometallic concentration can be maintained at a constant level by bleeding in fresh supplies of the organometallic vapor, or solution of organometallic in organic solvent. The activated oxide is then withdrawn from the vessel.

It is preferred that heat be applied during the mixing or treatment of the inorganic oxide with the organometallic to expedite the time of treatment or activation of the oxide. However, reaction can be conducted in the cold or at temperatures below room temperature as well as at elevated temperatures up to below that of the decomposition or pyrolysis point of the oxide and/or organometallic compound. In general temperatures of from about 25 to 250° C. can be employed while it is preferred to employ temperatures in the range of from about 45 to 150° C.

The treatment of the inorganic oxide and organometallic should be conducted under non-oxidizing or inert conditions, for example, in the absence of air, oxygen, moisture and so forth. Although not too desirable, the reaction vessel can be flushed out with the vapor of the organometallic or solvent if used and the reaction carried out only in the presence of the vapor of the organometallic and/or solvent. However, it is preferred to conduct the treatment in the presence of an inert gas such as nitrogen (preferably lamp grade), helium, neon, argon, krypton and other inert or non-reactive gas and the like and mixture thereof.

After the reaction or activation of the inorganic oxide with the organometallic, any excess or surplus amount of the organometallic can be removed if desired and the activated solid containing any residues used directly in the polymerization process. On the other hand the activated oxide can be used as the catalyst containing the excess organometallic alone or with the solvent, for example, while still somewhat wet with the same, in the form of a slurry, or as a dispersion in all of the solution of solvent and organometallic. The latter step is not too desirable as it results in some waste of the organometallic compound since any excess or surplus amount of the same can be used alone or with the solvent to activate other batches or quantities of the unactivated oxide. The excess organometallic as gas, in liquid form or in solvent can readily be separated from the oxide by decantation, filtration, centrifugation, evacuation, and so forth.

The activated inorganic oxide may be stored at room temperature or below under an inert atmosphere. Preferably, the catalyst is used in its freshly prepared form.

The activated inorganic oxide if agglomerated or in the form of chunks can readily be pulverized or powdered if desired prior to use in the polymerization process. The activated oxide can be added as such to the polymerization reactor or in an organic solvent as a slurry and so forth.

The organometallic compound can be mixed with any solvent which is non-reactive or inert to the organometallic or inorganic oxide or which does not form a complex with the organometallic compound or oxide during activation of the oxide. The solvent should be a liquid at the reaction or treatment temperatures, especially from 25 to 250° C., and should be used in an amount sufficient to dissolve the organometallic compound and provide a liquid medium. Generally, the solvent is used in an excess, several mols, over the amount of the organometallic. The organometallic-total solvent mol ratio, dependent to some extent on the solubility of the organometallic in the solvent, can vary from about 0.1:100 to 50:100 and preferably from about 7:100 to 20:100. The solvent should be non-halogenated and preferably should be a hydrocarbon free of aliphatic unsaturation such as butane, pentane, isopentane, hexane, 2-methyl hexane, 2,3-dimethyl hexane, heptane, 2,6-dimethyl heptane, 4-ethyl heptane, 4-methyl heptane, octane, 2,7-dimethyl octane, isooctane, nonane, decane, undecane, tridecane, tetradecane, pentadecane, octadecane, eicosane, cyclohexane, methyl cyclohexane, 1,3-dimethyl cyclohexane, methyl cyclobutane, 1,4-dimethyl cyclohexane, isopropyl cyclohexane, cycloheptane, cyclopentane, benzene, amyl benzene, butyl benzene, s-butyl benzene, t-butyl benzene, 1,3-diethyl benzene, ethyl benzene, 1-ethyl-4-isopropyl benzene, 1-phenyl propane, cumene, isodurene, pseudocumene, o-cymene, p-cymene, m-cymene, toluene, o-ethyl toluene, o-butyl toluene, p-ethyl toluene, 3,5-diethyl toluene, propyl toluene, o-xylene, 4-ethyl-o-xylene, m-xylene, 4-ethyl-m-xylene, 5-ethyl-m-xylene, p-xylene, 2-ethyl-p-xylene, mesitylene and the like and mixtures thereof. In some instances liquid organic nonpolymerizable hydrocarbon unsaturated solvents can be employed such as those having at least 8 or 9 carbon atoms. Examples of such solvents are octylene, 1,1-diisopropyl ethylene, 1-nonene, 1-decene, 2-hendecene, 1-dodecene, tridecylene, 1-tetradecene, cetene, menthene, beta-phellandrene, ditriptene, conylene and the like and mixtures of the same with each other and with the aforementioned solvents.

The cyclic oxides to be polymerized include any cyclic oxide or epoxide having oxygen-carbon ring in which an oxygen atom is joined to 2 carbon atoms in the ring which will open and polymerize with the same or other epoxide monomers and having up to a total of 70 carbon atoms. These monomers, also, may contain 1, 2 or more, preferably only 1, aliphatic carbon-to-carbon double bond. The alkenyl, nitro, ether and ester substituted derivatives of these epoxides can likewise be employed. The use of monomer mixtures having epoxide monomers containing aliphatic carbon-to-carbon double bond unsaturation in an amount of from about 0.5 or 5.0 to 15 or 30 mol percent or higher, the balance being the saturated epoxide monomer, permits the resulting copolymer to be cured readily with materials such as sulfur and the like. A very useful mixture is one containing propylene or butylene oxide in an amount of from about 97 to 99.5 mol percent and allyl glycidyl ether, vinyl cyclohexene monoxide, or butadiene monoxide in an amount of from 3 to 0.5 mol percent to obtain a crosslinkable (by sulfur) copolymer. Minor amounts, from about 0.5 to 20 mol percent, preferably from 1 to 10 mol percent, of a third, fourth or fifth etc. monomer, such as 1,2-butene oxide, 2,3-hexene oxide etc. of from 4 to 12 carbon atoms, can be present to break up or substantially entirely eliminate any crystallinity of the copolymer when desired, especially where only small amounts of an unsaturated monomer are needed and more flexibility in processing and molding are desired.

Examples of useful cyclic oxides are ethylene oxide, propylene oxide, 1,2-butene oxide (or 1,2-epoxy butane), 2,3-butene oxide, 1,2-dodecene oxide (or 1,2-epoxy dodecane), isobutylene oxide, 1,2-pentene oxide, isopentene oxide, styrene oxide, 1,2-diisobutylene oxide, 1,2-hexene oxide, 2,3-hexene oxide, 1,2-heptene oxide, 2,3-diisobutylene oxide, allyl glycidyl ether, isoheptene oxide, octene oxide, nonene oxide, decene oxide, 1,2-epoxy pentacosane, 1,2-epoxy heptacontane, hendecene oxide, methyl glycidyl ether, ethyl glycidyl ether, vinyl cyclohexene monoxide, nitro ethylene oxide, phenyl glycidyl ether, 3-methyl-3,4-epoxy butene-1, butadiene monoxide, glycidyl methacrylate, dicyclopentadiene monoxide, isoprene monoxide, allyl epoxy stearate, and other epoxides. Preferably, these epoxides have a total of from 2 to 25 carbon atoms. Of these materials it is even more preferred to use the lower molecular weight monoepoxides such as ethylene oxide, propylene oxide, butylene oxide, etc., containing from 2 to 12 carbon atoms with minor amounts of unsaturated (ethylenic) mono-epoxides such as allyl glycidyl ether, butadiene monoxide and vinyl cyclohexene monoxide etc. containing from 3 to 12 carbon atoms. Mixtures of these epoxides can be used.

Those compounds which have no ethylene unsaturation may be cured with mixtures of organic peroxides and sulfur or other curing agents.

Moreover, blends or mixtures of polymeric materials can be prepared by this invention. For example, a polymer or copolymer prepared with the catalyst of this invention or by the use of other catalysts can be melted or dissolved in solvent and one or more epoxide monomers and the present catalyst added and polymerization continued to obtain another polymeric material made in situ with, or on, the original polymeric material.

The catalyst product or activated inorganic oxide is used in a minor molar amount only sufficient to catalyze the reaction. Large amounts are usually wasteful and may in time cause reversion or subsequent decomposition of the polymer. In general, there is used a total of from about 0.01 to 20 mols of the catalyst product or activated oxide (computed as unactivated inorganic oxide solids) based on a total of 100 mols of the epoxide monomer or monomers being polymerized. However, it is preferred to use a total of from about 0.5 to 16.0 mols of the activated oxide (computed as unactivated oxide solids) based on 100 mols of the monomer(s). The lower catalyst concentrations tend to give higher molecular weight polymers.

The monomers may be polymerized with the catalyst in bulk or in mass, preferred, or in solvent at lower temperatures for longer times. They, also, preferably should be polymerized under inert and/or non-oxidizing conditions, for example, under an atmosphere of nitrogen, argon, neon, helium, krypton or other inert or non-oxidizing atmosphere. It is sometimes desirable to polymerize in a solvent since this facilitates handling and operation. Alternatively, the inert gas can be omitted and the monomer polymerized in the solvent only under pressure from any vaporized solvent or gaseous monomer. The monomer should be soluble in the solvent which should be an inert or non-reactive solvent. Examples of useful solvents are heptane, octane, cyclohexane, toluene, benzene, trimethylpentane, carbon tetrachloride, chloroform, diethyl ether, trichloroethylene etc. It is preferred to use non-polar hydrocarbon solvents such as those described above as well as those described with respect to the preparation of the catalyst. Since many of the monomers are volatile and to avoid oxidation, the polymerization should be conducted in a closed container under pressure. Polymerization can be conducted at temperatures of at least about 25° C., preferably at temperatures of from about 40 to 150° C. or even higher.

In general, the catalyst, activated inorganic oxide, at room temperature or sometimes at the temperature at which it was prepared is placed in the reactor and the monomer or monomer and solvent added at room temperature and heat applied as necessary to effect polymerization. If the polymer dissolves in the solvent, it can be precipitated with a non-solvent and recovered, or the solvent can be separated from the polymer by evaporation etc. The catalyst product or catalyst residues can be removed if desired by centrifuging a solution of the polymer. If it is desired to destroy or kill the catalyst, the polymer may be treated with water, alcohol solutions or dilute solutions of acids and the like. Alkaline materials may be used to neutralize the catalyst. The removal of the catalyst will depend upon the ultimate use of the polymer or copolymer. It is desirable to polymerize while agitating the reactants.

Since the reaction is exothermic and since some monomers may react very rapidly, it may be desirable to reduce the concentration of the catalyst product or to use a solvent or diluent as discussed above. Alternatively, the amounts of the catalyst product can be changed or the solvent eliminated to speed up the amount and rate of conversion or polymerization.

In the event that any gel forms and where it is not desired to have gel or a crosslinked (resinous) polymer but rather a rubbery or tacky solid polymer, inhibitors may be added. Examples of useful inhibitors are nitrobenzene, dinitrotoluene, dinitrodiphenyl, nitrodiphenyl amine, chlorodinitrobenzene and so forth. In some instances gel formation may be avoided by polymerizing in the dark. These inhibitors, also, are desirable to use to prevent premature gelling or crosslinking when the polymers are compounded on a rubber mill or in a banbury, etc. Antioxidants such as phenyl beta naphthylamine, also, are desirably added prior to or during polymerization.

Many of the polymers and copolymers etc. obtained by the method of the present invention have a high average molecular weight, i.e., from about 20,000 to 500,000 or higher, as shown by their high viscosities. They may be crystalline and/or amorphous. The resinous and rubbery polymers and copolymers, alone or in admixture with each other, are useful as coatings for fabrics, films for packaging materials, elastic fibers or thread, golf balls, adhesives, and in making tires, shoe heels, rain coats, gaskets, printing rollers, and upholstery materials, floor mats and tiles, sponges, rubber shoes, molded articles, bumpers, motor mounts, encapsulating compounds and the like. Low molecular weight solid or grease-like polymers of this invention are useful as plasticizers for natural and synthetic resins and rubbers.

The polymers, including copolymers, of this invention may be compounded with the usual rubber and resinous compounding materials, such as curing agents, antidegradants (stabilizing agents, antioxidants, antiozonants, etc.), fillers, extenders, reinforcing agents, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, sulfur, 2-mercaptobenzothiazole, bis-(morpholyl) disulfide, bis(benzothiazyl) disulfide, bis-(morpholyl) tetrasulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalo cyanine blue or green, asbestos, silicon monoxide, mica, wood flour, nylon or cellulose fibers or flock, clay, barytes, dioctyl phthalate, tricresyl phosphate, non-migrating polyester plasticizers, phenyl beta naphthylamine, pine oil, mineral oil, hydroquinone monobenzyl ether, mixtures of octylated diphenylamines, styrenated phenols, aldol alpha naphthylamine, diphenyl amine acetone reaction products, antimony oxide, asphalt, coumarone indene resin, natural rubber, polyisoprene, butadienestyrene rubber or resin, nitrile rubber, acrylonitrile-styrene resin, polyester and/or ether urethanes, polyvinyl chloride, vinyl chloride-vinylidene chloride copoloymers, and the like and mixtures thereof.

The following examples will serve to illustrate the present invention with more particularity to those skilled in the art:

Example I

In a bottle there are heated 2 gm. of $Sb_2O_3$, previously dried in an oven at 150° C., in suspension with a 2 ml. of diethyl zinc ($ZnEt_2$) dissolved in 20 ml. of dry heptane for 1 hour at 80° C. under nitrogen. The special design of the bottle allows the contents to be filtered, leaving the solid inside without contacting the air. After the heptane solution of the $ZnEt_2$ was filtered off, there were added to the activated $Sb_2O_3$ 13.4 ml. of propylene oxide (0.2 mol) and the mixture was heated at 80° C. for 24 hours under nitrogen to polymerize the propylene oxide.

After extracting the polymer with acetone, centrifuging the acetone solution, pouring it into water and drying the polymer, the conversion of monomer to polymer was 86%. The inherent viscosity of the polymer in benzene was 5.98 (0.2148 gm. polymer in 100 ml. benzene at 25° C.).

When the same polymerization procedures was followed using diethyl zinc alone, no polymer was obtained after 48 hours at 80° C. Also, when the antimony trioxide, dried in an oven at 150° C. or dried for 16 hours at 500° C. in nitrogen, was used alone, no polymer was obtained after a polymerization time of 48 hours at 80° C.

These results show the need for the activation of the antimony trioxide by the organometallic, since neither material is a catalyst by itself.

Example II

In a Pyrex glass tube 2 gm. of $Sb_2O_3$ (dried at 150° C. for 1 hour) were activated by heating for 1 hour at 80° C. with 2 ml. $ZnEt_2$ dissolved in 20 ml. dry heptane under a nitrogen atmosphere. Afterwards the liquid ($ZnEt_2+C_7H_{16}$) was decanted and transferred to a second tube which also had 2 gm. $Sb_2O_3$. The same activation was accomplished here and the liquid was transferred to a third tube and afterwards to a fourth one, each one containing 2 gm. $Sb_2O_3$ and activated for the same time and temperature. After the last activation (4th tube) the liquid was decanted from the $Sb_2O_3$, and it was observed to have finely divided particles of antimony trioxide suspended in it.

The 4 samples of activated $Sb_2O_3$ and the final liquid sample were used as a catalyst material to polymerize 13.4 ml. (0.2 mol) of dry propylene oxide under nitrogen.

The polymerization took place for 24 hours at 80° C. and the polymers were worked up by dissolving them in acetone with phenyl beta naphthylamine, centrifuging the solution, and pouring the clear acetone solution into water. The polymers obtained were rubbery.

The results obtained with the four activated $Sb_2O_3$ samples and the liquid suspension are shown below:

| Run No. | Catalyst | Percent Conversion | Inherent Visc. in benzene at 25° C. | Percent Ash | Remarks |
|---|---|---|---|---|---|
| II-A | 2 g. $Sb_2O_3$ activated by 2 ml. $ZnEt_2$ in 20 ml. heptane, 1 hr. at 80° C. under $N_2$. Liquid transferred to next tube. | 77 | 3.57 | 0.92 | 1.2 g. $Sb_2O_3$ recuperated from the polymer. |
| II-B | 2 g. $Sb_2O_3$ activated for 1 hr. under $N_2$ at 80° C. by liquid coming from previous tube (Run A), decanted. | 86 | 3.86 | 0.69 | 1.4 g. $Sb_2O_3$ recuperated from the polymer. |
| II-C | 2 g. $Sb_2O_3$ activated for 1 hr. under $N_2$ at 80° C. by liquid coming from previous tube (Run B), decanted. | 95 | 3.61 | 1.15 | 2.2 g. $Sb_2O_3$ recuperated from the polymer. |
| II-D | 2 g. $Sb_2O_3$ activated for 1 hr. under $N_2$ at 80° C. by liquid coming from previous tube (Run C), decanted. | 77 | 2.25 | 1.03 | 1.5 g. $Sb_2O_3$ recuperated from the polymer. |
| II-E | Liquid left from previous tube (Run D). | 77 | 3.85 | 0.87 | |

These results show that the inorganic oxide need only be treated with very small amounts of the organometallic compound to achieve the desired results or that the same liquid can be used to activate several batches of the inorganic oxide.

In a separate experiment 12 g. of $Sb_2O_3$ (dried at 150° C. for 48 hours) were treated for 1 hour at 80° C. under nitrogen with 10 ml. of diethyl zinc dissolved in 100 ml. of heptane. The activated $Sb_2O_3$ was then washed three times with 100 ml. of heptane in each case and decanted after each washing, filtered on a glass filter and washed once again with heptane. The zinc content of the activated $Sb_2O_3$ was 2.45% (spectroscopy analysis). This value corresponds to about 0.11 mol of diethyl zinc for each mol of $Sb_2O_3$.

Example III

In a Pyrex glass tube there were added 2 gm. of $Sb_2O_3$ (direct from the bottle, not previously dried), 20 ml. of dry heptane (dried by passing it through molecular sieves), and 2 ml. of $ZnEt_2$, under nitrogen.

The tube was heated for 1 hour at 80° C. in a water bath. After cooling down the tube to room temperature, 13.4 ml. (11.6 gm., 0.2 mol) of propylene oxide were added.

After shaking the tube at room temperature for 4 days, only a little viscous stuff was seen at the bottom of the tube, but after heating the tube at 80° C. for 1 day, all the contents were solidified.

The polymer was worked up by dissolving it in benzene, washing with 10% HCl and water and stripping off the solvent at reduced pressure. After drying, the conversion to polymer was 57%. The inherent viscosity of the polymer was 0.809 (in benzene), and its ash content was 0.24%.

In another run 2 gm. of $Sb_2O_3$, 20 ml. of heptane, 2 ml. of $ZnEt_2$, and 6.7 ml. of propylene oxide were mixed together under nitrogen and this mixture was heated at 80° C. for 24 hours, without previous activation of the oxide. The conversion to polymer was only 10% and the polymer obtained was a grease rather than a rubber.

This example shows the necessity for prior activation of the inorganic oxide to obtain high yields of rubbery products.

*Example IV*

2 gm. of antimony pentaoxide were mixed with 2 ml. of $ZnEt_2$ in 20 ml. heptane under nitrogen. The resulting mixture was heated for 1 hour at 80° C. The resulting mixture was decanted leaving the activated $Sb_2O_5$ which was mixed with 13.4 ml. of propylene oxide under nitrogen and heated to 80° C. for 24 hours. The polymer obtained was worked up with acetone and phenylbeta-naphthylamine, the resulting solution was centrifuged, and finally the clear acetone solution was poured into $H_2O$ to precipitate the polymer. The polymer was rubbery, represented a conversion of 13%, had an inherent viscosity in benzene at 25° C. of 6.61, and had an ash content of 1.02%. This example shows that activated antimony pentaoxide is a catalyst for propylene oxide.

*Example V*

In a Pyrex polymerization glass tube there were heated 2 gm. $CrO_3$ with 1.3 ml. $ZnEt_2$ dissolved in 20 ml. dry heptane (dried through molecular sieves) for 1 hour at 80° C. under nitrogen. After the tube was cooled down to room temperature, there were added 13.4 ml. propylene oxide. The tube contents were then heated at 80° C. for 24 hours. The polymer was worked up in a manner similar to the previous examples and gave a conversion of 26%. The inherent viscosity of the greasy polymer in benzene at 25° C. was 0.139. This example shows that activated $CrO_3$ is a catalyst for the polymerization of propylene oxide.

*Example VI*

2 g. $SnO_2$ were heated at 80° C. for 1 hour under $N_2$ with 2 ml. diethyl zinc in 20 ml. heptane. The liquid was decanted from the $SnO_2$ and added to a fresh batch of 2 g. of $SnO_2$ which were heated with the liquid for 1 hr. at 80° C. under $N_2$. The liquid was decanted from the second batch of $SnO_2$. To the activated $SnO_2$ (second batch) was added 13.4 ml. of propylene oxide and the resulting mixture was heated at 80° C. for 24 hours. The resulting polymer was worked up in a manner similar to that of the preceding example. 1.7% conversion to a rubbery polymer was thus obtained. This example shows that stannic oxide is a polymerization catalyst for epoxides.

*Example VII*

Stannous oxide, SnO, was activated and used as a catalyst for the polymerization (in mass) of propylene oxide in a manner similar to the methods of the preceding examples. The procedures employed and results obtained are shown below:

| Run No. | Monomer | Catalyst | PZN Time, hrs. | PZN Temp., °C. | Conversion, percent | Appearance of Product | Work up Procedure |
|---|---|---|---|---|---|---|---|
| VII-A | 13.4 ml. P.O. | 2 g. SnO activated by 2 ml. $ZnEt_2$ in 20 ml. heptane. 1 hr. at 80° C. under $N_2$. Liquid decanted from solid SnO. | 24 | 80 | 0.8 | Rubbery | Acetone, PBNA, pouring into $H_2O$. |
| VII-B | do | 2 g. SnO activated with liquid ($ZnEt_2$ + $C_7H_{16}$ solution from previous Run VII-A) for 1 hr. at 80° C. under $N_2$, decanted liquid from solid SnO. | 24 | 80 | 3.4 | do | Acetone, PBNA, pouring into $H_2O$. |
| VII-C | do | 2 g. SnO activated with liquid from previous tube (Run VII-B) for 1 hr. at 80° C. under $N_2$, decanted liquid from solid SnO. | 24 | 80 | 6.8 | do | Acetone, PBNA, pouring into $H_2O$. |
| VII-D | do | 2 g. SnO activated with liquid from previous tube (Run VII-C) for 1 hr. at 80° C. under $N_2$, then decanted from solid SnO. | 24 | 80 | *9 | do | Acetone, PBNA, pouring into $H_2O$. |

* Inherent viscosity in benzene at 25° C. was 5.29; percent ash was 1.09.

This example shows that stannous oxide is a polymerization catalyst for epoxides. PBNA is phenyl beta naphthylamine.

*Example VIII*

The method of this example was similar to the methods of the first two paragraphs of Example I, above, except that the $Sb_2O_3$ was washed with heptane after the liquid had been decanted from the activated solid and before adding the propylene oxide. The procedures employed and results obtained are shown below:

| Run No. | Catalyst | Conversion, percent | Appearance of Polymer Product | Polymer Workup | Inh. Visc.* |
|---|---|---|---|---|---|
| VIII-A | 2 g. $Sb_2O_3$ activated by mixing with 2 ml. $ZnEt_2$ in 20 ml. heptane (1 hr. at 80° C.) under $N_2$. Liquid decanted. Oxide washed once with 20 ml. pure heptane. | 89.6 | Rubbery | Acetone-PBNA, pouring into $H_2O$. | 3.50 |
| VIII-B | 2 g. $Sb_2O_3$ activated as above Run VIII-A (fresh $ZnEt_2$ and heptane) but washed twice with 2 separate batches of 20 ml. each of essentially pure heptane. | 92.2 | do | do | 7.64 |
| VIII-C | 2 g. $Sb_2O_3$ activated as above Run VIII-A, (fresh $ZnEt_2$ and heptane) but 3 washings with 3 separate batches of 20 ml. each of pure heptane. | 93 | do | do | 7.29 |

*In benzene at 25° C.

These results show that reasonable washing of the catalyst to remove theoretically any residual $ZnEt_2$ does not destroy its effectiveness but may even increase yields and viscosities.

*Example IX*

In a polymerization tube 2 g. of boron oxide, $B_2O_3$, were mixed with 2 ml. $ZnEt_2$ in 20 ml. of heptane and the resulting mixture was heated for 1 hour at 80° C. under an atmosphere of nitrogen gas. After cooling to room temperature, 13.4 ml. of propylene oxide was added without decanting the solution and polymerization conducted for 24 hours at 80° C. The contents of the tube were then poured into benzene, a dilute solution of HCl added, water was then added, and the benzene and HCl-water layer separated. The benzene layer was evaporated to yield a greasy polymer representing a yield of 18% and having an inherent viscosity in benzene at 25° C. of 0.441.

Example X

The method of this example was similar to the method of the first two paragraphs of Example I, above, and the method including the washing step of Example VIII, above, except that the organometallic used was triethyl aluminum instead of diethyl zinc, and one of the inorganic oxides used was $SnO_2$. The procedures followed and the results obtained are shown below:

These results show that the activated catalysts of the present invention are useful for the polymerization of certain saturated and unsaturated epoxides but are not useful for the polymerization of oxetanes, furans, thiofurans or chlorinated oxetanes or epoxides at reasonable temperatures and times.

Example XII

The method of this example was similar to the method of the first paragraph of Example I, above, except that the monomer used was a monomeric mixture of propylene oxide and allyl glycidyl ether in the mol ratio of about 97:3. Several runs were made. Samples of the copolymer were then compounded and used. In one series the activated $Sb_2O_3$ was removed (acetone-centrifugation-water) from the copolymer while in the second series it was not removed from the copolymer prior to compounding and curing. Copolymers were also cured with

| Run No. | Polymerization Recipe | | | PZN Time (hrs.) | PZN Temp. (° C.) | Conversion, Percent | Appearance of Product |
|---|---|---|---|---|---|---|---|
| | Monomer | Solvent | Catalyst | | | | |
| X-A | 26.8 ml. PO | Bulk | 2 g. $SnO_2$ activated by 2 ml. $AlEt_3$ in 20 ml. heptane. 1 hr. heating at 80° C. under $N_2$. Liquid decanted. Solid $SnO_2$ washed once with 20 ml. pure heptane before use in polymerization. | 24 | 80 | 14 | Grease. |
| X-B | 26.8 ml. PO | ----do---- | 2 g. $Sb_2O_3$ activated by 2 ml. $AlEt_3$ in 20 ml. heptane. 1 hr. heating under $N_2$ at 80° C. Liquid decanted. Solid $Sb_2O_3$ then washed once with 20 ml. pure heptane before use in polymerization. | 24 | 80 | 17 | Rubber. |

These results show that other organometallics can be used for the activation of the oxides.

Example XI

The method of this example was similar to the method of the first two paragraphs of Example I, above, and to the general method disclosed in Example II, above, except that other monomers were employed during the polymerization runs.

The procedures followed and the results obtained are shown below:

and without carbon black. The compounding recipe was as follows:

Material: Parts by weight
- Copolymer (97:3/PO:Age) _____ 100
- Phenyl beta naphthylamine _____ 1
- Philblack E (carbon black) as indicated below _ 40
- Stearic acid _____ 2
- Zinc oxide _____ 5
- Sulfur _____ 2
- Tetramethyl thiuram disulfide _____ 1
- Bis (benzothiazyl) disulfide _____ 1

| Run No. | Monomer (no solvent used) | Catalyst | PZN Time Hrs. | PZN Temp.° C. | Percent Conversion | Appearance of Polymer Product |
|---|---|---|---|---|---|---|
| XI-1 | 13.5 ml. epichlorhydrin | 2 g. $Sb_2O_3$ activated by 2 ml. $ZnEt_2$ in 20 ml. heptane, 1 hr. heating at 80° under nitrogen. Liquid taken away from solid activated $Sb_2O_3$ before polymerization. | 24 | 80 | No PZN | |
| XI-2 | 20 ml. diethyl oxetane | 2 g. $Sb_2O_3$ activated† as above run 1-new preparation, liquid removed. | 24 | 80 | No PZN | |
| XI-3 | 20 ml. AGE | 2 g. $Sb_2O_3$ activated† as above run 1-new preparation, liquid removed. | 24 | 80 | 100 | Rubbery. |
| XI-4 | 20 ml. styrene oxide | 2 g. $Sb_2O_3$ activated† by the liquid proceding from run 1, liquid removed from this $Sb_2O_3$. | 24 | 80 | 100 | Do. |
| XI-5 | 20 ml. phenylglycidyl ether. | 2 g. $Sb_2O_3$ activated† by the liquid proceding from run 2, liquid removed from the $Sb_2O_3$. | 24 | 80 | 100 | Hard solid. |
| XI-6 | 20 ml. THF | 2 g. $Sb_2O_3$ activated† by liquid proceding from run 3, liquid removed from this $Sb_2O_3$. | 24 | 80 | No PZN | |
| XI-7 | 20 ml. 3,3-dichloromethyl oxetane. | 2 g. $Sb_2O_3$ activated† by the liquid coming from run 4, liquid decanted from $Sb_2O_3$. | 24 | 80 | No PZN | |
| XI-8 | 20 ml. tetra hydrothiophene. | 2 g. $Sb_2O_3$ activated† by the liquid coming from run 5, liquid taken away from $Sb_2O_3$. | 24 | 80 | No PZN | |
| XI-9 | 20 ml. thiophene | 2 g. $Sb_2O_3$ activated† by the liquid coming from run 6, liquid taken away from $Sb_2O_3$. | 24 | 80 | No PZN | |
| XI-10* | 13.4 ml. PO | 2 g. $Sb_2O_3$ activated† by liquids coming from 3 previous activations, runs 7, 8, 9, liquid taken away from $Sb_2O_3$ before polymerization. | 24 | 80 | 37 | Rubbery. |
| X-11 | 20 ml. 1,4-dichloro-2,3-epoxy butane. | 1.5 g. $Sb_2O_3$ activated by 2 ml. $ZnEt_2$ in 20 ml. heptane for 1 hr. at 80° C. under $N_2$. Liquid taken away. | 24 | 80 | No PZN | |

NOTES: AGE-allyl glycidyl ether, THF-tetrahydrofuran, PO-propylene oxide, and PZN-polymerization.
*This run conducted to check, if the liquids from runs 7, 8, and 9 were still active to activate the $Sb_2O_3$ for the polymerization of propylene oxide.
†1 hour at 80° C. under $N_2$.

| | Cured Properties of Copolymers | | | | | | | |
|---|---|---|---|---|---|---|---|---|
| | Activated Sb₂O₃ Left in Copolymer | | | | Activated Sb₂O₃ Removed from Copolymer | | | |
| | Cure 30 Min. at 285° F. | | Cure 50 Min. at 285° F. | | Cure 30 Min. at 285° F. | | Cure 45 Min. at 285° F. | |
| | A*-1 | B†-1 | A-2 | B-2 | A-3 | B-3 | A-4 | B-4 |
| Tensile Strength, p.s.i | 1,509 | 2,475 | 750 | 2,550 | 2,425 | 2,475 | 2,675 | 2,725 |
| Percent Elongation | 650 | 600 | 440 | 480 | 760 | 620 | 750 | 580 |
| 300% Modulus, p.s.i | 281 | 1,125 | 325 | 1,500 | 225 | 1,050 | 225 | 1,275 |
| Shore A Durometer | 49 | 76 | 47 | 75 | 50 | 71 | 46 | 72 |

*"A", No carbon black.   † "B", With carbon black.

From the above data, it is apparent that the black stocks with the activated Sb₂O₃ removed and with the activated Sb₂O₃ remaining in the copolymer show somewhat similar physical properties. The tensile properties of the non-black stocks are better when the activated Sb₂O₃ has been removed, although it will be appreciated that tensile properties of non-black stocks are extremely sensitive to the state of cure.

Samples of compounded and cured copolymers, A-2 and B-2, above, were aged at 300° F. for 24 hours and then tested and compared with the unaged copolymers. The results obtained on testing are shown below:

| | Without Aging | | After Aging | |
|---|---|---|---|---|
| | A-2 | B-2 | A-2 | B-2 |
| Tensile strength, p.s.i | 750 | 2,550 | 425 | 1,850 |
| Percent elongation | 440 | 480 | 300 | 250 |
| 300% Modulus, p.s.i | 325 | 1,500 | 425 | |
| Shore A Durometer Hardness | 47 | 75 | 46 | 79 |

The fact that some physical properties are retained after aging shows that it is not always necessary to remove the activated oxide from the polymer.

Example XIII

Antimony trioxide (Sb₂O₃) was suspended in 20 ml. of heptane (dried over molecular sieves) in a tube reactor under nitrogen and diethyl zinc added. The tube was then heated for 1 hour at 80° C. and cooled to room temperature. After cooling there was added to the tube 0.25 mol of propylene oxide and polymerization conducted at 80° C. for 4 hours. After polymerization the contents were diluted with benzene containing some phenyl beta naphthylamine. The benzene solution of the polymer was filtered or centrifuged to separate the residual Sb₂O₃ and the solvent removed from the polymer by stripping under a vacuum. The conversion was computed after subtracting the amount of ash (catalyst residue) from the polymer obtained. The amounts of antimony trioxide and zinc diethyl used, the inherent viscosity of the polymer and the amount (conversion) of monomer to polymer are shown below:

| Run No. | Grms. Sb₂O₃ | Millimol of ZnEt₂ | Millimol ZnEt₂/ Grms. Sb₂O₃ | Inh. Visc. in isopropanol at 60° C. | Conversion, percent |
|---|---|---|---|---|---|
| XIII-1 | 1 | 1 | 1 | | Traces |
| XIII-2 | 1 | 2 | 2 | | Traces |
| XIII-3 | 1 | 5 | 5 | 2.43 | 14 |
| XIII-4 | 1 | 7 | 7 | 3.53 | 25 |
| XIII-5 | 1 | 10 | 10 | 1.50 | 40 |
| XIII-6 | 1 | 15 | 15 | 1.92 | 81 |
| XIII-7 | 1 | 25 | 25 | 3.62 | 85 |
| XIII-8 | 1 | 30 | 30 | 2.70 | 67 |
| XIII-9 | 2 | 1 | 0.5 | | 1.7 |
| XIII-10 | 2 | 2 | 1 | | 5 |
| XIII-11 | 2 | 5 | 2.5 | 3.16 | 95 |
| XIII-12 | 2 | 7 | 3.5 | 2.38 | 98 |
| XIII-13 | 2 | 10 | 5 | 1.98 | 99 |
| XIII-14 | 2 | 15 | 7.5 | | 95 |
| XIII-15 | 2 | 25 | 12.5 | | 77 |
| XIII-16 | 5 | 1 | 0.2 | 4.91 | 8 |
| XIII-17 | 5 | 2 | 0.4 | 5.81 | 94 |
| XIII-18 | 5 | 5 | 1 | 1.76 | 99 |
| XIII-19 | 5 | 7 | 1.4 | 1.68 | 100 |
| XIII-20 | 5 | 10 | 2 | 1.39 | 98 |
| XIII-21 | 5 | 15 | 3 | 2.32 | 76 |
| XIII-22 | 5 | 25 | 5 | 1.30 | 98 |

It is to be understood that in accordance with the provisions of the patent statutes, the particular compositions, products and methods described and set forth herein are presented for purposes of explanation and illustration and that various modifications of said compositions, products and methods can be made without departing from this invention.

What is claimed is:

1. The method of making a substantially linear polyether which comprises, under an inert atmosphere, mixing together at least one mono 1,2-epoxide and a catalyst composition and polymerizing said epoxide through its epoxide group in the presence of said catalyst composition at a temperature of at least about 25° C., (A) said epoxide having from 2 to 25 carbon atoms and being free of halogen atoms, and (B) said catalyst composition comprising an oxide selected from the group consisting of antimony trioxide, antimony tetraoxide, antimony pentaoxide, boron oxide, chromium trioxide, stannous oxide and stannic oxide and mixtures of said oxides, said oxide being activated for the catalytic polymerization of said epoxide by contacting said oxide with at least one organometallic compound selected from the group consisting of AlR₃, CdR₂, and ZnR₂, where R is a hydrocarbon radical of from 1 to 20 carbon atoms and is free of aliphatic unsaturation, and said catalyst composition being used in a minor molar amount as compared to said epoxide and sufficient to polymerize said epoxide to the solid state, said organometallic compound being used in an amount sufficient to activate said oxide for the polymerization of said epoxide.

2. The method according to claim 1 in which the polymerization of said epoxide is conducted in an inert organic solvent for said epoxide and where said organometallic has been used to contact said oxide in the mol ratio of organometallic to oxide of from about 0.03:1 to 12.0:1.

3. The method according to claim 1 in which the relative proportions of said catalyst composition computed as unactivated oxide solids to said epoxide are from about 0.01:100 to 20:100 moles, in which the temperature during polymerization is from about 40 to 150° C., and in which said oxide has been contacted with said organometallic compound at a temperature of from about 25 to 250° C.

4. The method of making a solid substantially linear polyether which comprises, under an inert atmosphere, mixing together at least one mono-1,2-epoxide and a catalyst composition and polymerizing said epoxide through its epoxide group in the presence of said catalyst composition at a temperature of from about 40° to 150° C., (A) said epoxide having from 2 to 12 carbon atoms and being free of halogen atoms, and (B) said catalyst composition comprising an oxide selected from the group consisting of antimony trioxide, antimony tetraoxide, antimony pentaoxide, boron oxide, chromium trioxide, stannous oxide and stannic oxide and mixtures of said oxides, said oxide being activated for the catalytic polymerization of said epoxide by contacting said oxide with at least one organometallic compound in an inert liquid organic solvent for said compound and at a temperature of from about 45° to 150° C. and being selected from the group consisting of $AlR_3$, $CdR_2$ and $ZnR_2$, where R is a hydrocarbon radical of from 1 to 20 carbon atoms and is free of aliphatic unsaturation, said organometallic compound being used to contact said oxide in the mol ratio of organometallic to oxide of from about 0.1:1 to 3.5:1, and the relative proportions of said catalyst composition computed as unactivated oxide solids to said epoxide being from about 0.5:100 to 16:100 mols.

5. The method according to claim 4 in which said organometallic compound is diethyl zinc.

6. The method according to claim 5 in which said oxide is antimony trioxide.

7. The method according to claim 5 in which said oxide is antimony pentaoxide.

8. The method according to claim 5 in which said oxide is boron oxide.

9. The method according to claim 5 in which said oxide is stannous oxide.

10. The method according to claim 5 in which said oxide is stannic oxide.

References Cited by the Examiner

UNITED STATES PATENTS

| | | | |
|---|---|---|---|
| 2,870,100 | 1/1959 | Stewart et al. | 260 |
| 2,905,646 | 9/1959 | Natta et al. | 252—431 |
| 2,908,674 | 10/1959 | Nowlin et al. | 252—431 |
| 2,946,778 | 7/1960 | Ke et al. | 252—431 |
| 2,952,643 | 9/1960 | Voge | 252—430 |
| 2,971,942 | 2/1961 | Masters et al. | 260—2 |
| 2,992,193 | 7/1961 | Porret et al. | 260—2 |
| 3,014,893 | 12/1961 | Susman et al. | 260—47 |
| 3,037,008 | 5/1962 | Garetzon et al. | 252—430 |
| 3,073,799 | 1/1963 | Skiff | 260—47 |

OTHER REFERENCES

Kambara et al.: J. Poly. Sci. 27, 584–586 (1958).

Furukawa et al.: Journal of Polymer Science, 36, 541–543, April 1959.

Furukawa et al.: Die Makromolekulare Chemie, 36, 25–30, Dec. 29, 1959 (Sci. Lib.).

Furukawa et al.: Die Makromolekulare Chemie, 32, 90 (1959) (copy in S. L.).

WILLIAM H. SHORT, *Primary Examiner.*

LOUISE P. QUAST, HAROLD BURSTEIN, JOSEPH R. LIBERMAN, *Examiners.*

J. E. ALIX, S. P. SULLIVAN, S. N. RICE, T. PERTILLA, *Assistant Examiners.*